United States Patent [19]

Ditcher

[11] Patent Number: 5,114,162
[45] Date of Patent: May 19, 1992

[54] GASKET FOR USE IN MANHOLE BASES AND THE LIKE

[75] Inventor: Jack Ditcher, Langhorne, Pa.

[73] Assignee: A-LOK Products, Inc., Tullytown, Pa.

[21] Appl. No.: 930,352

[22] Filed: Nov. 13, 1986

[51] Int. Cl.⁵ .................. F16J 15/10; F16J 15/32; F16L 21/02

[52] U.S. Cl. .................. 277/207 A; 277/181; 277/186; 285/110; 285/230; 285/231; 285/345

[58] Field of Search .......... 277/152, 153, 166, 207 R, 277/207 A, DIG. 2, 228, 181, 186; 285/110, 230, 231, 345, 232

[56] References Cited

U.S. PATENT DOCUMENTS

| | | | |
|---|---|---|---|
| 2,259,940 | 10/1941 | Nathan | 277/207 X |
| 3,493,237 | 2/1970 | Kleindienst | 277/207 A |
| 3,660,192 | 5/1972 | Smith et al. | 277/228 |
| 4,103,901 | 8/1978 | Ditcher | 277/9.5 |
| 4,159,829 | 7/1979 | Ditcher | 277/207 A |
| 4,298,206 | 11/1981 | Kojima | 277/207 A |
| 4,330,136 | 5/1982 | Henson | 277/228 |
| 4,333,662 | 6/1982 | Jones | 277/189 |
| 4,350,351 | 9/1982 | Martin | 277/207 A |
| 4,387,900 | 6/1983 | Ditcher et al. | 285/230 |
| 4,463,955 | 8/1984 | Delhaes | 277/9 |
| 4,508,355 | 4/1985 | Ditcher | 277/207 A |
| 4,598,915 | 7/1986 | Gilbert | 277/166 |

FOREIGN PATENT DOCUMENTS 269007  3/1969  Austria ................ 277/207 A

Primary Examiner—Allan N. Shoap
Attorney, Agent, or Firm—Louis Weinstein

[57] ABSTRACT

A gasket formed of an extruded elastomeric material which is joined at its ends to form a closed loop. The gasket has a cross-section defined by a T-shaped anchoring flange integrally joined to a substantially pear-shaped portion which tapers in the radially inward direction. An integral flange extends diagonally away from the radial direction and serves to significantly enhance the water-tight seal provided by the resilient gasket, as well as significantly increasing the range of pipe diameters capable of being accommodated by the gasket. Disc-shaped or cylindrical-shaped inserts insertable into cavities at angular intervals about the wall of the opening engage the gasket to center the pipe and to aid in reducing shearing forces.

11 Claims, 2 Drawing Sheets

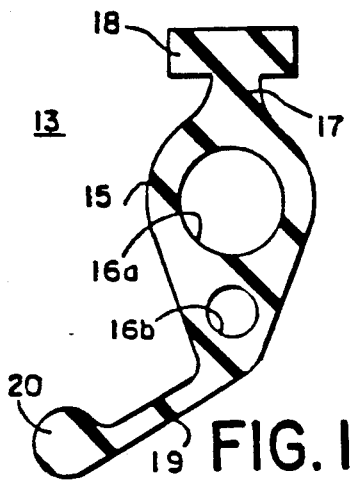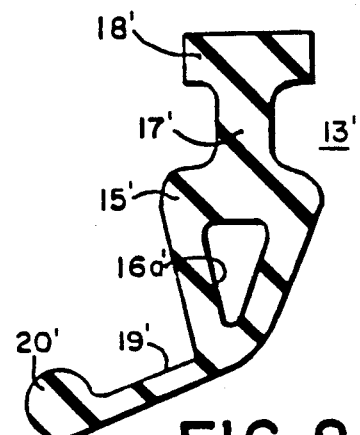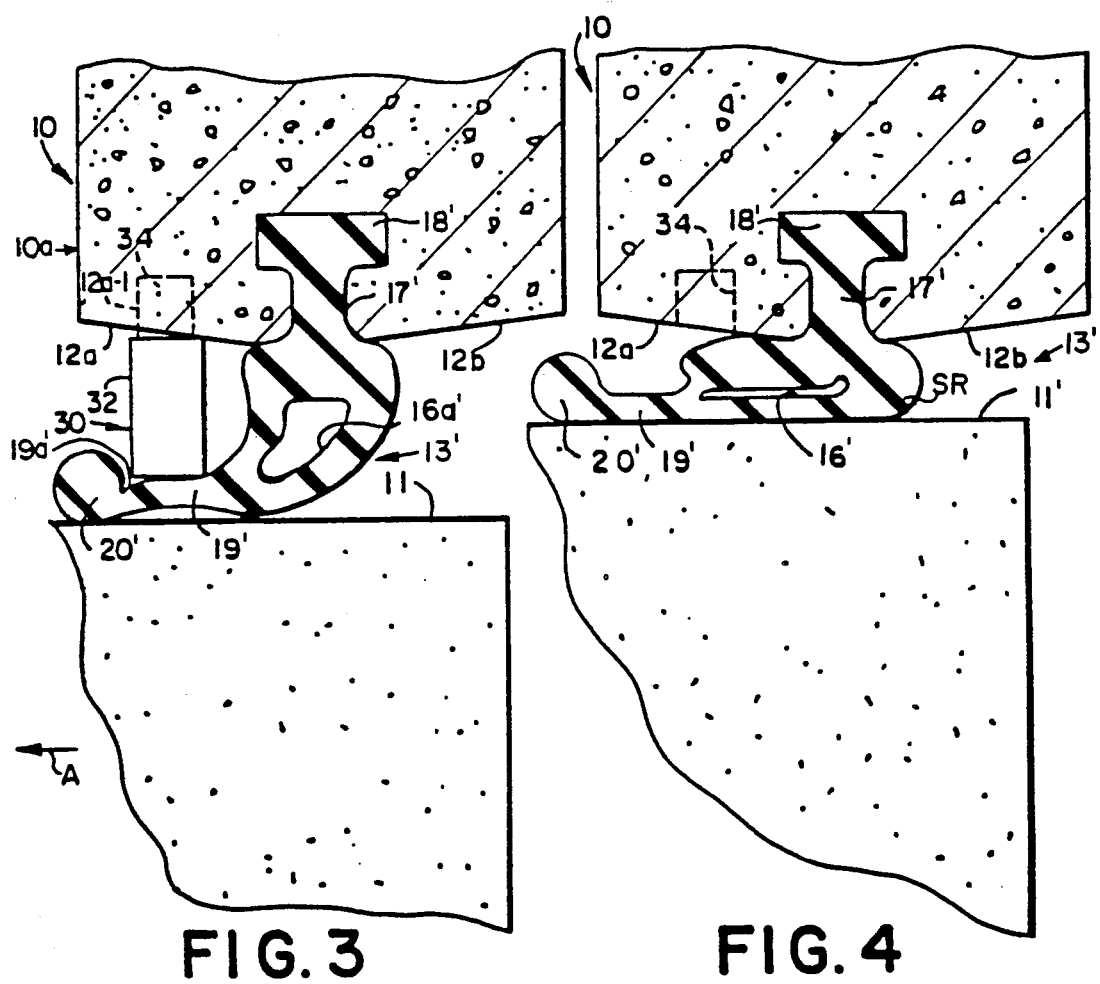
FIG. 1  FIG. 2  FIG. 3  FIG. 4

GASKET FOR USE IN MANHOLE BASES AND THE LIKE

FIELD OF THE INVENTION

The present invention relates to manhole assemblies and more particularly to a novel gasket for providing an excellent water-tight seal between a pipe and the inner periphery provided in the opening of a manhole base into which the pipe extends.

BACKGROUND OF THE INVENTION

It is well known to employ resilient elastomeric gaskets in manhole assemblies for providing water-tight seals. For example, U.S. Pat. No. 4,159,829 issued Jul. 3, 1979, and assigned to the assignee of the present invention, discloses a resilient, elastomeric gasket which is preferably extruded and has a cross-section which is designed to provide a substantially T-shaped portion for embedment into the opening of a manhole base and which has an integral, substantially pear-shaped portion extending radially inward from said anchoring portion for yieldable engagement with the outer periphery of a pipe inserted into said opening. The advent of the gasket disclosed in U.S. Pat. No. 4,159,829 showed that it was possible to form a disc-like washer from a linear extrusion by providing a pear-shaped pipe engaging portion integrally joined with a T-shaped anchoring portion, the ends of the extruded member being curved into the shape of a right cylinder after having being cut to the desired length, the ends of said linear extrusion being joined to each other such as by vulcanizing. The aforesaid gasket lends itself well to assembly within a manhole base through the use of a mold assembly of the type described in U.S. Pat. No. 3,796,406, assigned to the assignee of the present invention. The aforesaid mold assembly comprises first and second frustoconical-shaped mold members which, when joined, define an inwardly directed peripheral groove which encloses the apex of the gasket pipe engaging portion, while the outward radial portion of the gasket is fully exposed, facilitating firm embedment of the anchoring portion within the cast material forming the manhole base.

The gasket of U.S. Pat. No. 4,159,829 has been found to provide a more effective water-tight seal than gaskets molded as an apertured disk or washer. The gasket also provides good resistance to compression near the bottom portion of the manhole base opening while providing sufficient capacity for expansion of the gasket near the top portion of the manhole base opening. Although the gasket very tightly hugs the pipe which it surrounds, the range of pipe size which the gasket is capable of accommodating is limited.

BRIEF DESCRIPTION OF THE INVENTION

The present invention is characterized by providing a gasket having a cross-section, the major portion of which closely resembles the cross-section of the gasket disclosed in U.S. Pat. No. 4,159,829, but which distinguishes from the gasket of the last-mentioned patent by the inclusion of an additional sealing lip integrally joined with the inward end of the pear-shaped portion of the gasket and substantially diagonally aligned with an imaginary plane extending through the radially aligned center line of the gasket. The free end of the lip is preferably provided with an enlarged beaded portion.

In one preferred applicational embodiment, the gasket is embedded within a manhole base opening in much the same manner described in U.S. Pat. 4,159,829 and through the use of the mold rings disclosed in U.S. Pat. No. 3,796,406 so that the added sealing lip extends diagonally inward toward the center of said opening and toward the exterior surface of the manhole base. With this orientation, the pipe is inserted from the interior of the manhole base and outwardly through the manhole base opening and gasket. This is accomplished by using a short section of pipe to facilitate the handling of the pipe within the manhole base interior. After being pushed through the gasket, the short section of pipe is then joined to the adjacent pipe section external to the manhole base through the use of a connector, such as a bell, provided on the adjoining pipe.

The lip of the gasket, with the pipe in place, provides a unique seal which is unidirectional in nature, in that the forces external to the manhole base exert pressure upon the sealing lip which serves to enhance and increase the liquid tight seal between the gasket and the pipe so that the material (i.e. subsurface liquid) located external to the manhole base acts upon the aforesaid lip to cause it to more tightly encircle and press upon the enclosed pipe. This action enhances the otherwise sufficient water-tight seal obtained through the conventional gasket described in U.S. Pat. No. 4,159,829, thus further significantly enhancing and improving the water-tight seal, as well as providing a gasket which is capable of accommodating a range of pipe sizes beyond that capable of being accommodated by the gasket disclosed in U.S. Pat. No. 4,159,829.

The gasket may alternatively be oriented within the manhole opening with the sealing lip extending diagonally downwardly and inwardly with the pipe being mounted in the same fashion described hereinabove to cause the sealing lip to be turned "inside-out"., Alternatively, the gasket may be mounted in either of the two abovedescribed orientations with the pipe inserted from the external side of the manhole base, although the first mentioned orientation is preferred due to the fact that the external pressure applied upon the sealing lip serves to enhance and increase the liquid-tight seal.

The enlarged bead provided at the free end of the sealing lip further serves to enhance the tight sealing grip of the lip upon the external surface of the enclosed pipe.

The wall of the manhole opening may also be provided with centering discs preferably arranged at 90° intervals to aid in centering the enclosed pipe and also to provide additional protection of the pipe from shearing forces. The centering discs are preferably formed of a hard rubber and are inserted into positioning openings provided in the wall of the opening receiving the gasket. The centering discs are positioned beneath the gasket and cooperate with the gasket to provide the dual functions of aiding in the centering of the pipe and shielding the pipe from experiencing harmful shearing forces.

OBJECTS OF THE INVENTION AND BRIEF DESCRIPTION OF THE FIGURES

It is therefore one object of the present invention to provide an extruded type gasket for providing a water-tight seal between the opening in a manhole base and a pipe extending through said opening, said gasket having a sealing lip enhancing the water-tight seal and for increasing the range of pipe sizes which may be accommodated by the gasket.

Still another object of the present invention is to provide a gasket of the type described in which the aforementioned sealing lip is oriented to take advantage of external pressure to further enhance the water-tight seal between the gasket and the pipe.

Another object of the present invention is to provide centering discs cooperating with a gasket in the opening of a manhole base to aid in centering the pipe and to shield the pipe from shearing forces.

The above as well as other objects of the present invention will become apparent when reading the accompanying description and drawing in which:

FIG. 1 shows a cross-section of an extruded gasket embodying the principles of the present invention.

FIG. 2 shows a cross-sectional view of another alternative gasket of the present invention.

FIGS. 3, 4 and 5 show sectional views of a gasket arranged within a manhole base opening and having a pipe installed, said pipes shown being respectively the maximum and minimum outer diameters capable of being accommodated by the gasket of the present invention and showing the mold rings which hold the gasket during casting of the manhole base.

FIG. 7b is an end view of a manhole opening showing an arrangement of centering discs of the type shown in FIG. 7a.

FIG. 7c is a perspective view showing another type of centering member which may be employed as an alternative to the centering disc of FIG. 7a

DETAILED DESCRIPTION OF THE INVENTION AND THE PREFERRED EMBODIMENTS THEREOF

Figure 5:
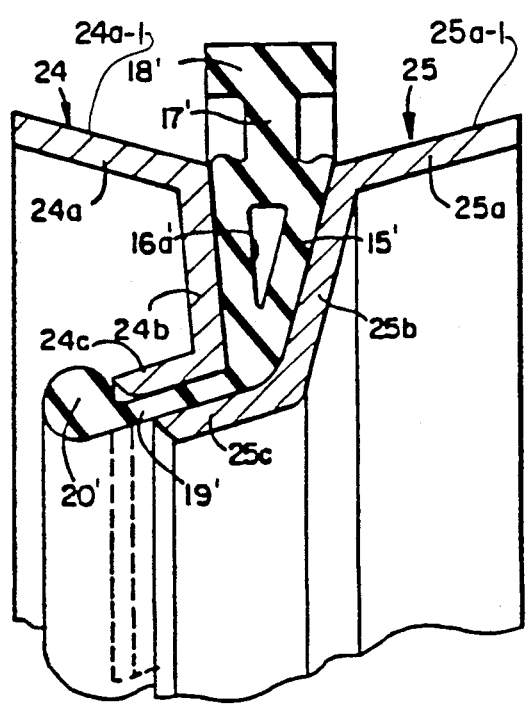

The gasket of the present invention is especially adaptable for use in manhole structures of the type described, for example, in FIG. 1 of U.S. Pat. No. 4,159,829 referred to hereinabove and which is incorporated herein by reference thereto. Such manhole bases are conventional and, as shown in FIG. 1 of U.S. Pat. No. 4,159,829, comprise a manhole structure 10 having a sewer pipe (or pipes) 11 extending into the manhole structure by way of openings 12, 12. The ring-shaped gasket 13 is embedded within the cast material forming each opening 12, 12 and tightly grasps the pipe 11 thus providing a water-tight seal between the pipe and the manhole. The gasket 13 shown, for example, in FIG. 1, is formed of a continuous extrusion of rubber or rubber-like material or other suitable material such as EPDM. Gasket 13 has a T-shaped portion defined by horizontally aligned longitudinal flange 18 integrally joined to vertically aligned web 17 which interconnects flange 18 with the central portion 15 of gasket 13 which is substantially pear-shaped and preferably encloses first and second cavities 16a and 16b of circular cross-section. The cavities 16a and 16b are preferably continuous and extend the length of the extrusion. A sealing lip 19 is integral with the narrow end of portion 15 and extends diagonally therefrom. Lip 19 is substantially uniform in thickness extending from central portion 15 to enlarged beaded end 20.

The gasket is formed by initially producing a linear extrusion having the cross-section shown in FIG. 1. The extrusion is cut into the desired length, is curved into the form of a right cylinder and its ends are brought together and vulcanized, as is conventional. For example, the bringing together of the ends and the vulcanization is shown, for example, in FIG. 4 of U.S. Pat. No. 4,159,829 and has thus been omitted herein for purposes of simplicity. The technique described in U.S. Pat. No. 4,159,829 may be utilized for the joining and vulcanizing steps, or any other suitable technique may be employed.

In order to properly install the gasket 13 within a manhole base opening, a mold substantially similar to the type described and claimed in U.S. Pat. No. 3,796,406 may be utilized, the latter patent being incorporated herein by reference thereto, said mold being modified to accommodate the gasket of the present invention as shown, for example, in FIG. 5.

As shown in FIG. 5, a pair of frustoconical rings 24, 25 are adapted to be clamped together and configured to embrace therebetween the tubular head portion 15 of gasket 13. Rings 24 and 25 include substantially toroidal-shaped members 24a, 25a, which define the frustoconical surface portions of the manhole base opening, as will be more fully described hereinbelow. Integral with portions 24a and 25a are intermediate portions 24b, 25b which embrace central portion 15 of gasket 13 in the manner shown. Integral with and extending downwardly and to the left of portions 24b, 25b, are inner portions 24c, 25c which embrace a portion of lip 15 while allowing the beaded end 20 to be free of the mold rings 24, 25.

The gasket ring is stretched somewhat in order to fit between mold rings 24 and 25. The mold rings are joined together in conventional fashion as shown, for example, in FIGS. 6 and 7 of U.S. Pat. No. 4,159,829 to maintain the gasket under compression as shown in FIG. 5 of the present application.

The mold rings are positioned between inner and outer mold members which define the manhole base, as is conventional. The cast material is poured into the mold assembly and completely surrounds flange 18 and substantially embeds web 17 in the cast material 19 (see FIGS. 3 and 4). The cast material flows against the outer surfaces 24a-1, 25a-1 of rings 24, 25. When the cast material has set, the locking member holding the mold rings is removed and the mold rings are separated and removed from the cast material, surfaces 24a-1, 25a-1, forming the frustoconical surfaces 12a, 12b of opening 12.

All of the advantageous characteristics and features of the gasket and its manner of assembly as described in U.S. Pat. No. 4,159,829 are retained in the gasket 13 and assembly in the present invention and the gasket 13 of the present invention preferably retains the proportional lengths and thicknesses described in U.S. Pat. No. 4,159,829 for the central 15, web 17 and flange portions 18. The gasket is embedded so that the cast material engages the rounded corners 15a, 15b of the central portion enabling the gasket to roll somewhat under the stress imposed by the insertion of pipe 11. The dimensional relationships set forth in U.S. Pat. No. 4,159,829 may also be utilized to incorporate the advantageous features and characteristics derived from these dimensional relationships.

In the preferred embodiment shown in FIG. 3, pipe 11 comprises a short section of pipe which is placed within the interior of the manhole base and which has its left-hand end, relative to FIG. 3, moved in a direction shown by arrow A causing fairly extensive distortion of beaded end 20, lip 19 and head portion 18. The frustoconical surfaces 12a, 12b accommodate the displaced alignment of pipe 11 relative to the imaginary longitudinal axis crossing through the center line of opening 12.

With the gasket in place and with pipe 11 inserted, the gasket is distorted from the position it occupies prior to insertion of the pipe. A significant amount of the surface area of the gasket engages the outer periphery of pipe 11 so that minor pits, defects and deviations of the outer surface of pipe 11 do not prevent the gasket from forming a good, water-tight seal about the pipe.

The pear-shaped portion of gasket 13 has sufficient thickness to provide more than adequate rubber or rubber-like material between the pipe 11 and the opening 12 to prevent the pipe from either engaging or resting upon the cast material which would tend to weaken and even severely damage the pipe in the presence of shocks and/or momentary stresses. Tension imposed upon the circumference of the gasket 13 insures that tight contact is maintained along the upper surface of the pipe in spite of the amount of compression experienced by the gasket at the lower portion thereof.

The tightness of the water-tight seal may be further enhanced by injecting a non-hardening self-sealing material into one or both of the cavities 16a, 16b by insertion of the fine point of a syringe containing a filler material. The pressure build-up within the cavity may be attained by mechanical pumping action of the syringe or by use of urethane and a foaming agent, or both. The self-sealing characteristic of the injected material serves to seal the opening left by the syringe point.

FIGS. 2 through 5 show a gasket of slightly modified design as compared with gasket 13 shown in FIG. 1. More specifically, gasket 13' in FIGS. 2 and 3 is provided with a cavity 16' whose shape substantially conforms to the outer shape of central portion 15'.

FIG. 3 shows gasket 13' in place with an opening 12 of a manhole base and encircling a pipe of minimum diameter. It can be seen that the beaded portion 20', lip 19' and a small portion of the head portion 15' engage the outer surface of pipe 11. Only half of the opening of the assembly has been shown in FIG. 3 for purposes of simplicity, it being understood that the portion of gasket 13' beneath the bottom of pipe 11 firmly embraces the associated bottom surface of pipe 11 in a similar fashion, except that with the weight of the pipe exerted downwardly, the bottom portion of gasket 13 can be expected to undergo additional compression as compared with the top half of the gasket, these relative differences in compression being shown, for example, in FIG. 8 of U.S. Pat. No. 4,159,829.

As was mentioned hereinabove, a short section of pipe is provided and the pipe is Placed within the interior of the manhole base and is moved in the direction shown by arrow A through gasket 13' and opening 12 so that pipe 11 extends beyond the outer surface 10a of manhole base 10. In this position, the gasket experiences a unilateral pressure differential in that the pressure of subsurface water or other material external to the manhole base 10 exerts a greater force upon the exposed surface 19a' of lip 19' than the internal forces, with the result that a greater force is exerted upon the exposed surface of lip 19 which further enhances the water-tight seal between pipe 11 and gasket 13'.

FIG. 4 shows a similar arrangement, but wherein the pipe 11' is of maximum diameter whereby gasket 13' undergoes maximum compression. In the arrangement shown in FIG. 4, the subsurface water and/or other material external to the manhole base exerts a resultant force on lip 19' that enhances the water-tight seal created by lip 19' upon the pipe 11'. FIG. 4 shows the significantly increased size range of pipe diameter which the novel gasket of the present invention is capable of accommodating.

Figure 6:
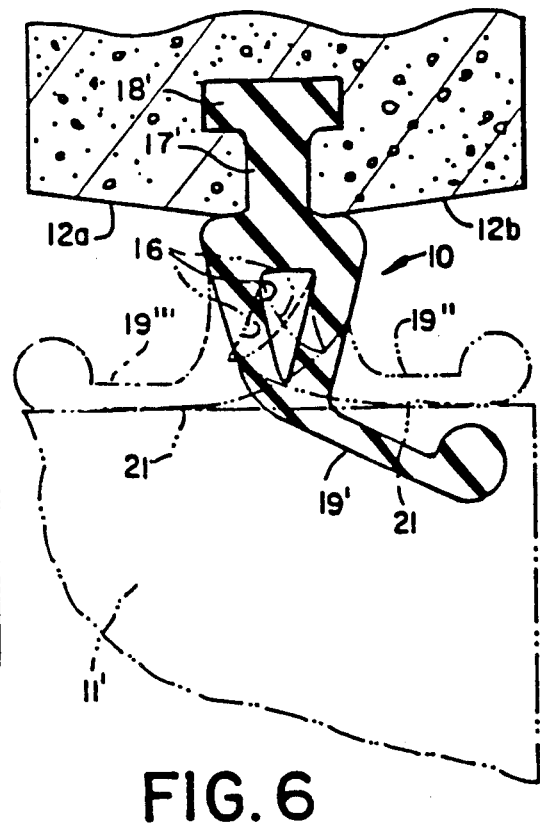
FIG. 6 shows a developmental view of the gasket of the present invention showing the manner in which a pipe may be inserted into the gasket.

Although the preferred orientation of the gasket is as shown in FIGS. 3, 4 and 5, i.e., with the lip extending diagonally downwardly and outwardly toward the external surface of the manhole base 10, it should be understood that the gasket can also be oriented in the opposite direction, i.e., with the lip 19' extending diagonally downwardly and inwardly toward the interior of the manhole base as shown in FIG. 6. With the last-mentioned orientation, the pipe 11 may be inserted either from a position external to the manhole base, i.e., in the embodiment 19" shown in dotted fashion in FIG. 6 or, alternatively, a short section of pipe may be inserted into the gasket from the interior side of the manhole base and thus be forced outwardly to the external side of the manhole base, whereby the gasket lip 19" is turned "inside-out" as shown at 19'''. The "memory" of the gasket tends to exert increased pressure upon the pipe extending therethrough. For a pipe having a diameter which is at or near the minimum diameter capable of being accommodated by the gasket, it is possible that a portion of the gasket in the interior region of the bend formed between head portion 15 and lip 19 may be slightly displaced from the surface of pipe 11 leaving a small void 21. This condition, however, does not degrade or detract from the water-tight seal between gasket and pipe.

Figure 7A:
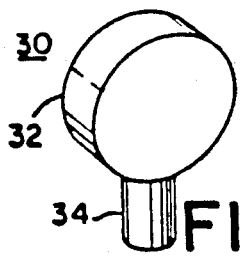
FIG. 7a shows a view of a centering disc which may be used with the gasket of the present invention.
Figure 7C:
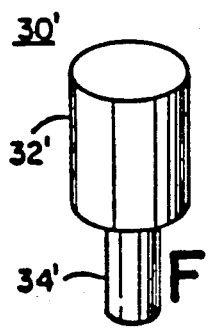
Figure 7B:
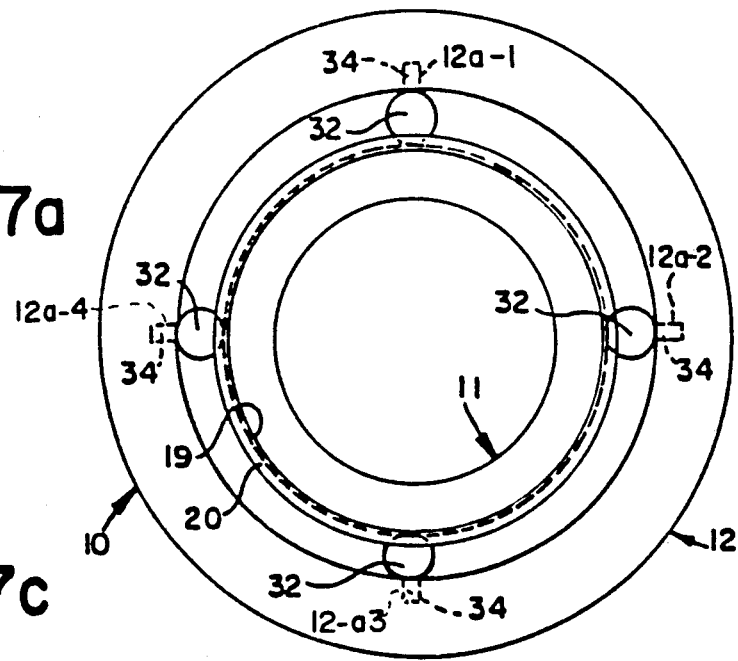

As shown in FIGS. 7a, 7b and 3, the manhole assembly may be provided with a plurality of centering members 30 each having a disc-shaped portion 32 with an integral stem 34 extending from one portion thereof. Each such stem 34 is arranged within an opening 12a-1 through 12a-4, which openings are provided at 90° intervals along surface 12a of manhole opening 12. Each of the disc portions 32 are arranged between surface 12a and lip 19 of gasket 13 to support the gasket and increase the amount of rubber between the surface of opening 12 and the pipe positioned within gasket 13.

Each centering device 30 is preferably formed of a hard rubber material of the order of 90 Durometer. The centering devices cooperatively function to center the pipe within opening 12 thereby significantly reducing the increased compression otherwise experienced by the gasket in the absence of centering devices 30. Being positioned between surface 12a and lip 19, the arrangement significantly increases the amount of cushioning rubber between the opening and the pipe to further cushion the shock of shearing forces and the like.

The stems 34 of the center members fit into the openings 12a-1 through 12a-4 rather easily, i.e., it is not necessary to provide a force fit, since the gasket substantially serves to hold the centering devices in place. Obviously, once the pipe 11 is inserted, the centering members are further assured of retaining their positions within openings 12a-1 through 12a-4. The centering devices may have disc-shaped portions of a diameter sufficient to maintain gasket lip 19 under at least slight compression between the centering device disc-shaped portions and the pipe extending through the gasket. Alternatively, the fit between the gasket and the centering device disc-shaped portions may be a loose one, but, nevertheless, provide additional rubber at the four contact points (i.e. at "3 o'clock", "6 o'clock", "9 o'clock" and "12 o'clock") to significantly enhance the cushioning effect provided against vibration and/or shearing forces experienced by pipe 11. The centering discs also reduce the amount of compression experienced by the bottom portion of the gasket 3 to assure more uniform compression about the gasket.

Although the embodiment of FIG. 7b shows the use of four centering discs, a or lesser number may be employed, ranging to none for larger (heavier) pipe or four or more centering discs for smaller diameter pipe. The diameters of the disc-shaped portions of the centering discs may be selected to enable the use of pipes of the maximum and minimum diameter ranges shown, for example, in FIGS. 3 and 4. It should be understood that if the maximum diameter pipe were used the discs could be eliminated entirely. Also, the upper-most disc positioned within opening 12a-1 may be omitted since the gravitational force is normally sufficient to maintain the pipe in engagement with the three remaining centering discs arranged at "3 o'clock" "6 o'clock" and "9 o'clock". As another alternative two discs may be used, said discs being arranged at "4 o'clock" and "8 o'clock", i.e. 120 degrees apart.

As an alternative to the centering disc 30 of FIG. 7a the centering member 30' shown in FIG. 7c may be employed. The major difference between members 30 and 30' is that the disc portion 32 of FIG. 7a is replaced by the cylindrical portion 32' of FIG. 7c. Portions 34, 34' are substantially identical. The centering devices 30' are used in a manner similar to centering discs 30 including the number of devices employed and their relative positioning about the manhole opening.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An annular gasket for providing a fluid-tight seal between a sewer pipe and an annular opening in a wall of cast material through which said sewer pipe passes, said opening having a central axis, said gasket comprising a length of a linear extrusion of elastomeric material having first and second ends and having a cross-sectional configuration comprising a central portion having a substantially pear-shaped cross-section defining a wide and a narrow end and tapered sides extending between said wide and narrow ends; said length being bent into an annular gasket so that said first and second ends are joined to oppose each other; an outer radial embedment portion of substantially T-shaped cross-section defining a cylindrical-shaped flange portion of the annular gasket and defining a web portion integrally joined at one end thereof to the mid region of said flange portion and integrally joined to the mid region of the wide end of said pear-shaped central portion;

said flange portion and part of the web portion being embedded in said wall when it is cast;

said annular gasket having a radially inwardly end portion remote from said embedment portion comprising an elongated lip having a cross-section defined by an elongated rectangle ending in a bead at the free end thereof, the thickness of said lip except for the bead in cross-section being less than the width of the narrow end of said central portion and having a first end integrally joined to the narrow end of said central portion, said lip extending away from said central portion and terminating in a second free end, said lip extending in a direction diagonal to an imaginary plane passing through said web portion and said central portion when said gasket is in an unstressed state, said imaginary plane being substantially perpendicular to the central axis of said opening;

the web portion and the central portion lying along said imaginary plane when in the unstressed state, the second free end of said lip defining an opening which is smaller in diameter than the outer diameter of a sewer pipe to be inserted into the gasket; and said lip and at least a portion of one of the tapered surfaces adjacent said narrow end of said central portion being so related as to embrace said sewer pipe when said sewer pipe is forced into the gasket.

2. The annular gasket of claim 1 wherein said bead is defined by an enlarged toroidal-shaped bead of generally annular cross section thicker than said lip.

3. The annular gasket of claim 2 wherein the diameter of said bead is greater than the thickness of said lip.

4. The annular gasket of claim 1 wherein said central portion is provided with at least one hollow toroidal-shaped cavity which is fully enclosed within the central portion when the gasket is in the unstressed state.

5. The annular gasket of claim 4 wherein said cavity has a circular cross-section.

6. The annular gasket of claim 4 wherein said cavity has a substantially triangular-shaped cross-section.

7. The annular gasket of claim 1 wherein said central portion is provided with first and second cavities of toroidal shape.

8. The annular gasket of claim 7 wherein one of said cavities is larger in cross-section than the other of said cavities.

9. The annular gasket of claim 8 wherein both of said cavities have circular cross-sections.

10. The annular gasket of claim 1 wherein the pressure on one side of said wall is greater than the pressure on the opposite side of said wall;

said gasket being oriented within said side wall so that said lip extends toward said high pressure side of said wall thereby the pressure on the side of said wall exerted upon said lip further enhances the water-tight seal formed about said pipe by said lip.

11. The annular gasket of claim 1 wherein said sewer pipe, having a predetermined longitudinal axis, is pushed through said annular gasket to urge the lip of said annular gasket in a direction substantially parallel to said longitudinal axis to further enhance the water-tight seal formed by said lip about said pipe.

* * * * *

UNITED STATES PATENT AND TRADEMARK OFFICE
CERTIFICATE OF CORRECTION

PATENT NO. : 5,114,162

DATED : May 19, 1992

INVENTOR(S) : Jack Ditcher

It is certified that error appears in the above-identified patent and that said Letters Patent is hereby corrected as shown below:

<u>Column 2</u>
Line 38, change abovedescribed to -- above-described --

<u>Column 7</u>
Line 9, after "a" insert -- greater --

Signed and Sealed this

Thirteenth Day of July, 1993

Attest:

*Attesting Officer*

MICHAEL K. KIRK

*Acting Commissioner of Patents and Trademarks*